Aug. 23, 1966 G. J. SHARROW, JR 3,268,079
WATER SKIMMER
Filed Dec. 19, 1962 2 Sheets-Sheet 1

INVENTOR.
GILFRED J. SHARROW JR
BY
*L. S. Michelman*
Atty.

Aug. 23, 1966    G. J. SHARROW, JR    3,268,079
WATER SKIMMER
Filed Dec. 19, 1962    2 Sheets-Sheet 2

INVENTOR.
GILFRED J. SHARROW JR
BY
Atty.

3,268,079
WATER SKIMMER
Gilfred J. Sharrow, Jr., 25 Bacon Ave.,
West Springfield, Mass.
Filed Dec. 19, 1962, Ser. No. 245,902
4 Claims. (Cl. 210—169)

This invention is concerned with a mechanism for removing debris, dust, scum and other floating objects from the surface of water and with the particular purpose of removing these items from swimming pools and the like.

There are in existence many types of mechanisms which attempt to remove the aforesaid debris from the surface of water. Most of these devices fail in one basic respect in that when the water level drops below the particular mechanism that is involved in drawing up or vacuuming the surface of the water, air instead of water enters the pumping equipment and the said pumping equipment becomes what is known in the art as "air-locked," making it necessary to dismantle parts to overcome this problem.

It is a primary object of the within invention to provide a novel skimmer for removing debris from the surfaces of water, which has a mechanism that prevents "air-locking."

Another object of the within invention is to provide a mechanism for removing debris from the surface of water which has a means for preventing "air-locking" independent of the water level.

It is yet an additional object of the within invention to provide a simple mechanism that controls the amount of intake of water into the pumping mechanism.

It is still a further object of the within invention to provide a mechanism for removing debris from water which has a simple adjustment for attachment to the swimming pool, which is inexpensive in the cost of manufacture.

It is a further object of the within invention to provide a skimmer for removing debris and the like from the surface of water which will not become air-locked even when the water is under a great amount of agitation and the surface of the water is not at a constant level.

These and other objects are obtained by the use of a buoyancy control valve. The buoyancy control valve remains always at the level of the water and permits water to come within the chamber in which it is located so that at no time will air be drawn into the intake of the pump mechanism.

There are also means to keep the skimmer itself at a proper level so that the water fall which will draw in the debris will always be constant.

For a more detailed description of the within invention, reference is made to the accompanying drawings, in which.

Figure 2:
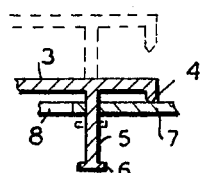
FIGURE 2 is a view in cross-section of the valve assembly itself which is shown in the view of FIGURE 5.

The skimmer housing comprises an upper portion 1 and a lower portion 2. In the embodiment herein shown, the upper portion 1 is of a larger cross-section diameter than the lower portion diameter of the segment 2. There is within the skimmer housing 1 a basket which comprises the lip 9, which bends over and grips the edge of the skimmer housing 1 on both sides, a mesh wire screen 14, a smooth surface 13 which is free from the effect of turbulence of the water, and a support 13a which strengthens the mesh 14 at the lower portion of the screen assembly.

There is also a horizontal support upon which the water line 15 is measured when the adjustments are made, as will be hereinafter explained.

In the skimmer herein described, it is necessary to have a source of a pumping action or the creation of a vacuum for the purpose of drawing the water over the smooth side 13 of the skimmer 1 in order to create a waterfall effect.

Figure 1:
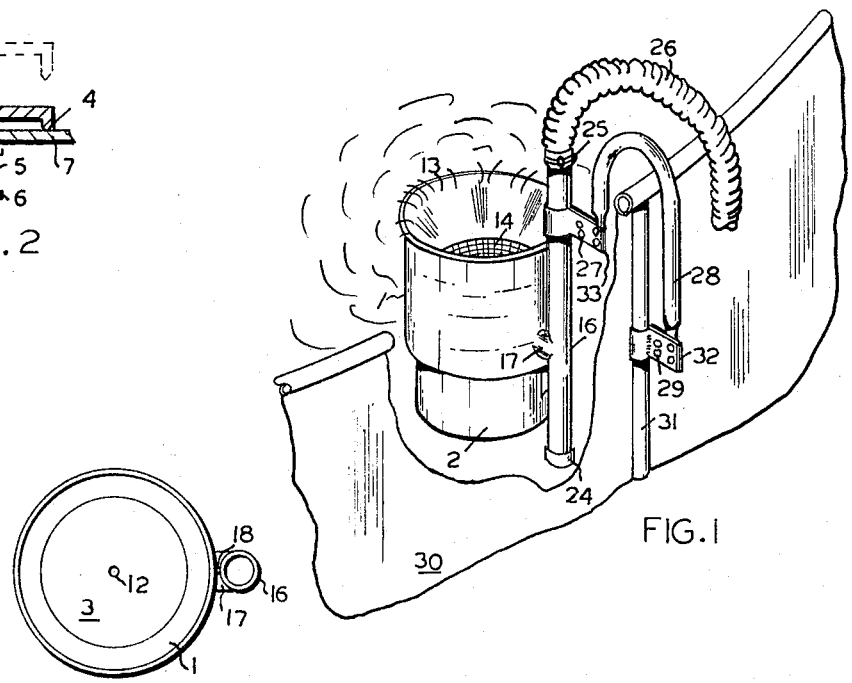
FIGURE 1 is a perspective view of the assembly of this invention mounted on the side of the type of a swimming pool that is above ground level.

The pipe 16, which is hollow, is connected to an opening 19 in the skimmer housing 1. The pipe 16 is maintained in a permanent position by means of the support member 18, which can be seen in a top view in FIGURE 3 and in a side elevational view in cross-section in FIGURE 5. The pipe 16 has at its top a cap 24, which is locked into position by a screw-type clamp 25. The purpose of cap 24 with the clamp member 25 is to cover up the pipe 16 when the assembly is to be used in an underground pool. The reverse situation takes place when the assembly is to be used in an above the ground type of pool, as can be seen in the view of FIGURE 1. In that view, it is apparent that the cap 24 is at the bottom of the pipe 16.

Figure 3:
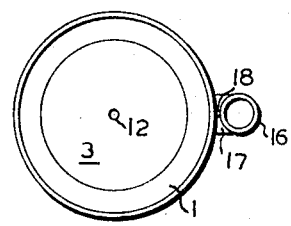
FIGURE 3 is a top elevational view of the skimmer mounted on the pipes to the pump.

Going back to the view of FIGURE 3, the bottom of the pipe is connected by plumbing components, including sleeves 20 and ring packing 21. The sleeve 20 is threaded for engagement with the segment of the pipe 22 which reduces the cross-section of the pipe 16 so that it can engage the elbow 23, which is permanently secured to the intake pipe 23a of the pump mechanism not shown.

Figure 5:
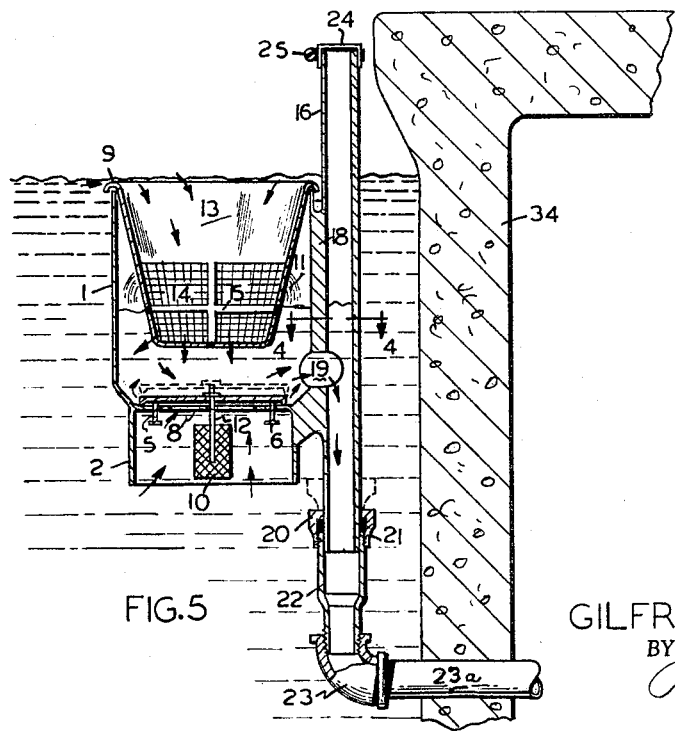
FIGURE 5 is a side elevational view in cross-section of the assembly with the mechanism mounted upon the wall of an underground type of swimming pool, and with the valve assembly in a normal operating position.
Figure 4:
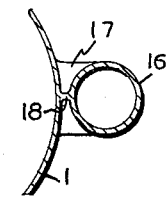
FIGURE 4 is a cross-section view taken along line 4—4 in the view of FIGURE 5.

In the view of FIGURE 5 is the sidewall of the underground pool 34.

In the view of FIGURE 1 is the sidewall 30 of the above the ground type of swimming pool. There is a different problem with the above ground swimming pool for supporting this skimmer assembly. The above the ground type pool has a pool support pipe 31. Connected to this pipe 31 is a clamp support member 32. Fastened to the clamp member 32 is a "bent around" type of support member 28. Support member 28 is fastened to the clamp 32 by means of wing bolts 29, or could be by means of rivets or other similar type of fastening means.

At the upper portion of the bent shaped support 28 is a clamp 33, which is similar in structure to clamp 32, and which is fastened to the clamp by means of rivets or wing bolts 27. In this instance, clamp 33 is connected to the pipe 16 which, as already mentioned, is connected to the skimmer 1 by means of the opening 19, as can be seen clearly in the view of FIGURE 5.

In the view of FIGURE 1, the opening appears at the area designated by the numeral 17. In the above the ground type of swimming pool, as shown in FIGURE 1, there is the flexible hose 26 which is connected from the top of the pipe 16 and is fastened thereto by the clamp 25. The flexible hose 26 is connected to a filter intake not shown.

Most of the components that have just been described are somewhat conventional. The crucial point of novelty exists in the buoyancy control mechanism of the skimmer, which mechanism is located in the lower portion of the skimmer 2. The buoyancy control mechanism consists of a valve assembly. The valve assembly comprises a lid, which is in fact the top of the buoyancy valve designated by the numeral 3, and which can be clearly seen in the view of FIGURE 2. Connected to the lid 3 is the guide rod 5. The guide rod 5 maintains the lid in a constant path or locus and prevents it from lateral displacement.

At the bottom of the guide member 5 is an abutment 6, which acts as a ridge or locking mechanism for preventing the guide rod 5 from displacement beyond the opening in the member 7. The member 7 is flat and is seated in the lower portion of the chamber 2 of the skimmer assembly. In the member 7 is the opening 8, which permits the flow of water from beneath the skimmer bottom chamber 2. There is a lead counter balance 10 of a predetermined weight, which acts as an anchoring member to which the stem 12 is attached. The stem 12 functions as a guide connector for the counter balance. It maintains the counter balance permanently in the top lid 3 of the buoyancy control mechanism. At each end of the lid 3 is the valve seat 4, which is a vertical extension or ring that makes contact with the upper surface of the member 7. This prevents the water passing through the opening 8 from gaining admittance into the upper portion above the member 3 and consequently into the opening 19 in the pipe 16.

When the device has been connected properly, as shown in FIGURE 5, in normal operation, there will be a flow of water over the edge 9 of the skimmer basket assembly and the water will follow the paths of the arrows to the mesh screen 14 of the basket. The water will then spill out from the side of the mesh screen 14 over the water line marker 15 on the screen into the lower portion of the upper skimmer chamber 1. The water will then flow directly into the opening 19 under the suction pressure of a pump (not shown) and will travel the path down through the pipe 19 and eventually into the intake 23a of the pump. When the water fall goes over the edge 9 of the skimmer chamber 1, there will be in the water in the swimming pool a current that will cause all floating debris to fall into that location. Most of the debris will remain in the basket, and at a subsequent time the basket assembly 13, 14, 15, etc. can be removed from the skimmer 1 and cleaned out. Some of the debris obviously will go into the filter through the suction of the pump and eventually the filter itself will have to be cleansed.

Figure 6:
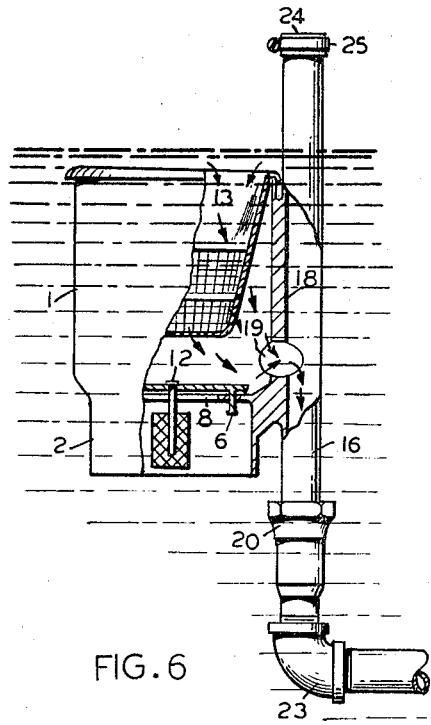
FIGURE 6 is a view similar to the view of FIGURE 5, but with the skimmer completely submerged, which would bring about no skimming effect of the water, and showing the lack of the adjustment necessary for proper function.

When, however, the water level is not as shown in FIGURE 5, but is as shown in FIGURE 6, wherein the water level is considerably higher than the edges of the skimmer 1, then the buoyancy control valve assembly in the lower portion of the skimmer 2 has a different operation, which is as follows:

The valve mechanism will remain closed; the buoyancy control will not function; there will be too much water going into the pump; there will be no skimming effect upon the water because the inside of the screen 14 is completely filled with water.

Figure 9:
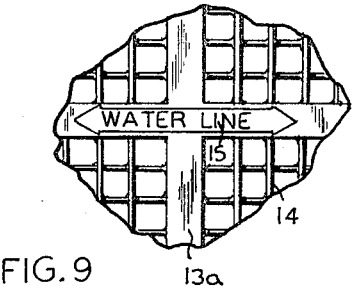
FIGURE 9 is a side elevational view of the water line marking on the basket within the skimmer.
Figure 7:
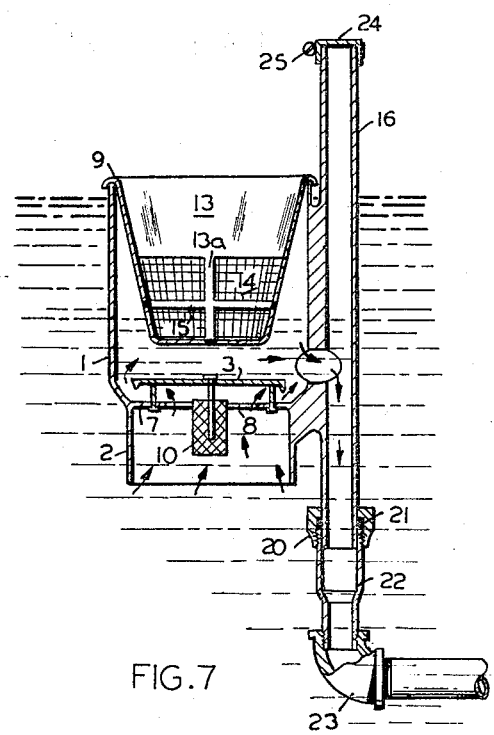
FIGURE 7 is a view of the skimmer above the surface of the water, with no water flow, but with the valve assembly in an open position and working.
Figure 8:
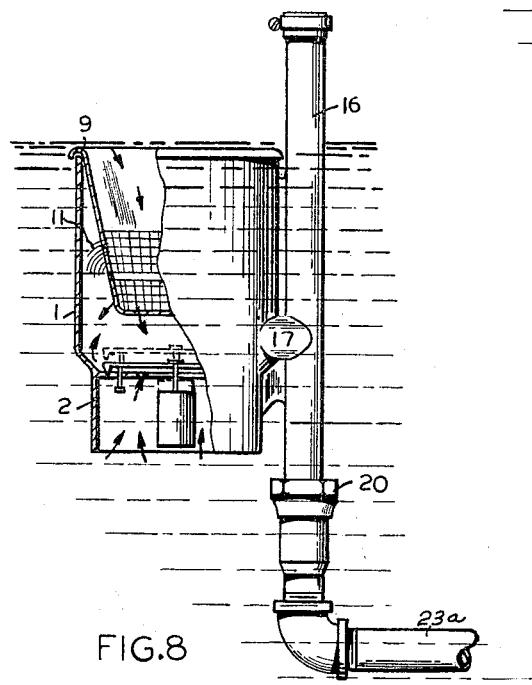
FIGURE 8 is a similar view to FIGURE 5 partially in cross-section.

Consequently, it will be necessary for the user of the device to readjust the assembly and raise it to the proper level. The necessary adjustment is made in FIGURE 1 by loosening the wing nut 27 on the clamp 33 and pulling the pipe 16 up high enough so that the water coming over the edges of the skimmer 1 and coming out of the mesh screen 14 will be hitting at the water line 9 as shown in FIGURE 9, and also as shown in the view of FIGURE 7. This adjustment will take the position as shown in FIGURE 5.

The next situation is when the water level of the pool has dropped considerably below the edge 9 of the basket. At this point no water will overflow the edge 9 of the basket, and the skimmer chamber would in effect become empty of water, and in the normal type of skimmer air would be drawn into the intake of the pump and the pump would become "air-locked." In this particular invention, this cannot occur. When the mechanism as shown in FIGURE 7 is not drawing in water from the top, immediately the weight of the mechanism is naturally reduced and the moving parts of the buoyancy control in the lower part of the skimmer 2, namely, the valve mechanism, which has already been described, will open up under the pressure of the water which is beneath it. The water flow, shown by the direction of the arrows in FIGURE 7, will place sufficient pressure on the lower surface of the top lid 3, forcing the top lid 3 upwardly and causing vertical abutments 4 to become disengaged from contact with member 7. Immediately, the water which has already passed through the opening 8, will then flow above 7 and beneath 3, past the now open abutment 4, into the opening 19 of the pipe 16, and follow the course into the filter. Under these circumstances, there can never be any "air-locking." It will soon become apparent that there is no skimming water fall, but until this is discovered, the valve mechanism will remain open. In this instance, as soon as the skimmer assembly is lowered on the pipe 16 by the clamps 33 and the wing nuts 27 to the proper position, the buoyancy control valve will stop and the water fall coming over 9 will commence.

It is now apparent that the valve mechanism consisting of the counter balance 10, the opening 8, and the member 7 and the top 3 with the abutment member 4 act as an automatic buoyancy control and always maintain water in the pipe 16, so that there can never by any "air-locking."

Most of the above explanation has been in regard to the adjustment on the swimming type pool shown in FIGURE 1, which is above the ground.

The adjustment on the underground type of pool is made by turning the pipe 16 in the threaded member 20, or else turning the threaded member 20 on the pipe 16. By making the turn of 20 or of 16, the height of 16 will either be lowered or raised, depending upon the direction of the turn. This will have the same effect as the loosening of the clamp 33 and raising and lowering the clamp on the pipe 16. It is to be understood that the entire adjustment of the mechanism is done by hand, and that the prevention of water locking is done automatically.

Certain dimensions in the drawings have been exaggerated somewhat for the purpose of teaching the invention more clearly.

It is contemplated also that various types of fastenings and details of structure may be modified without departing from the spirit and scope of this invention.

In consideration of the foregoing, I claim:

1. A water skimmer having a buoyancy control valve assembly for controlling the feed of surface water to a filter, said water skimmer having an axially vertical unitary upper cylindrical housing with an open top and a lower cylindrical housing with an open bottom and having a basket mounted within the upper housing, said valve assembly being mounted in the lower housing and comprising a weighted counterbalance, a fixed flat member above said counterbalance, said fixed member connected to the interior periphery of the skimmer, a movable lid member, said movable lid member having a rod means extending therefrom for permanent connection with said counterbalance, an opening within said fixed member for permitting the aforesaid connecting means to pass therethrough, a lip extending downwardly from said lid for contact with said fixed member, other openings in said fixed member whereby when said lip is not in contact with said fixed member water will pass through said opening and between said lip and said fixed member from the basket into an outlet in the upper housing which is connected to the filter.

2. A water skimmer having a buoyancy control valve assembly for controlling the feed of surface water to a filter, said water skimmer comprising an axially vertical unitary upper cylindrical housing with an open top and a lower cylindrical housing with an open bottom, said upper housing having a removable basket mounted therein, said lower housing having mounted therein said valve assembly having a fixed flat member, said fixed member in contact with the inside periphery of the lower housing, a movable lid member, a counterbalance located below said fixed member, an opening within said fixed member, said movable lid member connected to said counterbalance through said opening, said movable lid member having a lip extending downwardly along its periphery, said lip adaptable for contact with said fixed member, whereby said lip will be moved under the control of the counterbalance, other openings in said fixed member whereby when said lip is not in contact with said fixed member, water will pass from the lower side of said fixed member through said openings and between said lip and said fixed member from the basket into an outlet in the upper housing which is connected to the filter.

3. A water skimmer having a buoyancy control valve assembly for controlling the feed of surface water to a filter, said skimmer having an axially vertical unitary upper cylindrical housing with an open top and a lower cylindrical housing with an open bottom, said valve assembly being in the lower housing and comprising a lid, a guide rod connected to the said lid, said guide rod preventing the lid from lateral displacement and maintaining its locus constant, an abutment located on the lower portion of said guide rod for controlling the vertical movement of the side guide rod, a fixed flat member, said fixed member adapted to be seated inside the periphery of said skimmer, an opening in said fixed member, a weighted counterbalance, a stem connected to said lid and to said weighted counterbalance through and below said fixed member, a lip or seat at the periphery of the said lid and being adapted to make water-tight connection with the top of said fixed member whereby when said lid is displaced above said fixed member water will pass from the upper cylindrical housing through said opening in said fixed member and beneath said lip, and whereby when said lid is proximate the said fixed member, the valve seat will be in water-tight connection with said fixed member and water cannot flow therethrough.

4. A water skimmer having a buoyancy control valve assembly for controlling the feed of surface water to a filter, said water skimmer having an upper axially vertical unitary cylindrical chamber with an open top and a lower cylindrical chamber with an open bottom said valve assembly being in the lower chamber and comprising a lid, a guide rod connected to the said lid, said guide rod preventing the lid from lateral displacement and maintaining its locus constant, an abutment located on the lower portion of said guide rod for controlling the vertical movement of the side guide rod, a fixed flat member, said fixed member adapted to be seated inside the periphery of the lower chamber of the said skimmer, an opening in said fixed member, a weighted counterbalance, a stem connected to said lid and to said weighted counterbalance through and below said fixed member, a lip or seat at the periphery of the said lid and being adapted to make water-tight connection with the top of said fixed member whereby when there is no water above said lid, said lid is forced away from said fixed member by water passing through said opening in said fixed member, said water then passing beneath said lip.

References Cited by the Examiner
UNITED STATES PATENTS

| | | | |
|---|---|---|---|
| 1,781,874 | 11/1930 | Hopkins | 210—136 X |
| 2,564,023 | 8/1951 | Miller | 137—533.17 |
| 2,809,752 | 10/1957 | Leslie | 210—169 X |
| 3,036,712 | 5/1962 | Barbara | 210—169 |
| 3,067,879 | 12/1962 | Baker | 210—169 X |
| 3,078,870 | 2/1963 | Merritt et al. | 137—534 X |
| 3,101,092 | 8/1963 | Seaborne | 137—534 X |

REUBEN FRIEDMAN, *Primary Examiner.*

F. W. MEDLEY, *Assistant Examiner.*